United States Patent [19]
Hagisawa et al.

[11] Patent Number: 5,689,814
[45] Date of Patent: Nov. 18, 1997

[54] RADIO COMMUNICATION APPARATUS WITH EXPANDED DYNAMIC RANGE

[75] Inventors: Hiroshi Hagisawa, Gunma-ken; Kazuo Watanabe, Takasaki; Kyoichi Takahashi, Fujioka; Kenji Takahashi, Takasaki; Michio Waki, Gunma-ken; Tadashi Matsuoka, Takasaki, all of Japan

[73] Assignees: Hitachi, Ltd.; Hitachi Microcomputer System, Ltd., both of Tokyo, Japan

[21] Appl. No.: 291,870

[22] Filed: Aug. 17, 1994

[30] Foreign Application Priority Data

Aug. 20, 1993 [JP] Japan ................................ 5-206365
Nov. 10, 1993 [JP] Japan ................................ 5-281202

[51] Int. Cl.$^6$ ........................................ H04B 1/16
[52] U.S. Cl. .................. 455/69; 455/226.2; 455/311; 455/341
[58] Field of Search .................. 330/310, 311, 330/150, 129, 257, 288, 263; 455/33.1, 54.1, 54.2, 69, 70, 226.1–226.4, 212, 213, 250.1, 249.1, 246.1, 311, 296, 303, 308, 333, 326, 341, 126, 127, 254, 253.2, 251.1, 252.1, 225, 214, 82, 83, 89, 88, 84; 379/59, 60

[56] References Cited

U.S. PATENT DOCUMENTS

| | | | |
|---|---|---|---|
| 4,109,206 | 8/1978 | Numafa | 455/226.2 |
| 4,247,949 | 1/1981 | Watanabe et al. | 455/226.2 |
| 4,553,105 | 11/1985 | Sasaki | 455/249.1 |
| 4,701,719 | 10/1987 | Nagata | 330/257 |
| 4,794,343 | 12/1988 | Yang | 330/129 |
| 4,890,332 | 12/1989 | Takahashi | 455/226.2 |
| 4,920,321 | 4/1990 | Armstrong | 330/257 |
| 4,972,512 | 11/1990 | Garskamp | 330/310 |
| 5,057,788 | 10/1991 | Ushida et al. | 330/310 |
| 5,125,105 | 6/1992 | Kennedy et al. | 455/226.2 |
| 5,129,098 | 7/1992 | McGerr et al. | 455/126 |
| 5,136,259 | 8/1992 | Sato et al. | 330/257 |
| 5,212,834 | 5/1993 | Nuqvist | 455/311 |
| 5,311,144 | 5/1994 | Grasset | 330/257 |
| 5,386,588 | 1/1995 | Yasuda | 455/69 |

FOREIGN PATENT DOCUMENTS

| | | | |
|---|---|---|---|
| 60-70372 | 4/1985 | Japan . | |
| 60-83427 | 5/1985 | Japan | 455/249.1 |

OTHER PUBLICATIONS

Hitachi Review, vol. 42 No. 3, Jun. 1993, "Mobil Communication System: Its Semiconductor Technology", pp. 95–124.

Primary Examiner—Reinhard J. Eisenzopf
Assistant Examiner—Thanh Le
Attorney, Agent, or Firm—Fay, Sharpe, Beall, Fagan, Minnich & McKee

[57] ABSTRACT

Part of a first signal path for amplifying a signal includes circuits for detecting a signal, and a second signal path connected to an input portion of the first signal path includes circuits for detecting the signal. A signal strength detector circuit adds outputs from the respective detector circuits in the first and second signal paths. The first signal path has a function of expanding the dynamic range in a smaller signal region as compared with the second signal path, while the second signal path has a function of expanding the dynamic range in a larger signal region as compared with the first signal path. When a radio transmitted output is variably controlled in a radio transmitter section based on a field strength detection output for a received signal, the transmitted output is optimized, resulting in minimizing consumed power and unnecessary radiation of radio waves.

17 Claims, 11 Drawing Sheets

FIG. IA
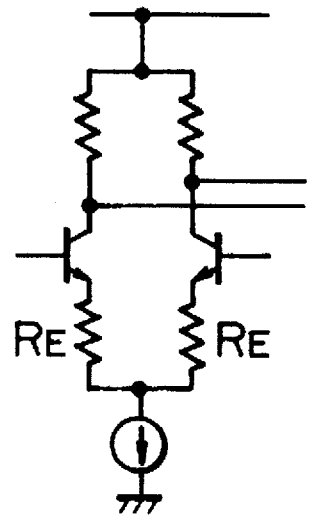
FIG. IB
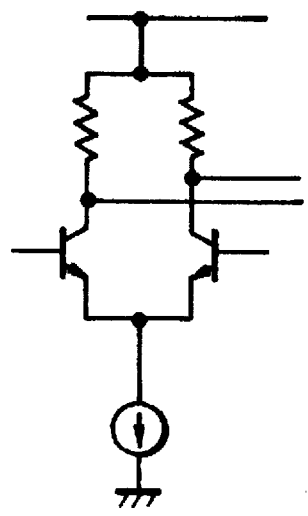

1

RADIO COMMUNICATION APPARATUS WITH EXPANDED DYNAMIC RANGE

BACKGROUND OF THE INVENTION

The present invention relates to techniques which are effectively applicable to radio communication apparatuses, and more particularly, to digitally controlled mobile communication apparatuses. More specifically, the present invention is directed to techniques which are effectively utilized in portable telephones of zone selection type, i.e., so-called cellular telephones.

A mobile radio system is disclosed in Y. Hishida et al, "Mobile Communication System: Its Semiconductor Technology", HITACHI REVIEW, Vol. 42-No. 3, pp. 95-124, June 1993. Also, a signal field strength detector circuit is disclosed in JP-A-60-70372.

In radio communication apparatuses, particularly mobile radio communication apparatuses such as a cellular telephone, a radio zone (cell), a communication channel (communication frequency), and so on may be frequently changed in accordance with transmission conditions. The selection of a radio zone (cell) and a communication channel (communication frequency) is made based on the field strength of a received signal. Therefore, a highly accurate function of detecting the field strength of a received signal is indispensable to a portable radio telephone such as a cellular telephone in order to constantly and properly carry out the above-mentioned control.

A conventional signal amplification/detection output circuit having an amplifier circuit composed of a plurality of cascade connected amplifiers, each providing an amplified signal and a detection signal, adds circuit currents of the respective amplifiers, which vary in accordance with respective amplified signal amplitudes, to produce a summed detection signal which is then supplied to a signal strength detector circuit. The signal strength detector circuit performs processing such as smoothing on the produced detection signal and outputs a voltage signal at a DC level indicative of a detected field strength of a received signal. A variety of controls such as a search for an optimal received frequency are performed based on the field strength detection output thus produced.

However, the present inventors have discovered that the above-mentioned techniques have the following problems.

First, while the above-mentioned conventional radio communication apparatus should reduce the noise figure (NF) of the amplifier circuit for amplifying a received signal for demodulation as well as expand the dynamic range for detecting the field strength of received signals, these two operations are in contradiction to each other.

Specifically explaining, if a resistor Re is inserted at the emitter of each of a pair of transistors constituting a differential amplifier circuit as shown in FIG. 1A, a relatively large dynamic range results as shown in FIG. 2A. The emitter resistors Re, however, may be sources of noise such as heat noise, so that they may exhibit a side effect that the noise figure of the amplifier circuit is degraded. With a degraded noise figure, the noise level included in an amplified received signal may be raised to adversely affect the demodulation of received signals.

On the other hand, if the emitter resistors Re are removed from the differential amplifier circuit as shown in FIG. 1B, a better noise figure and a larger amplification factor, i.e., sensitivity of the amplifier circuit are provided. However, this larger amplification factor of the amplifier circuit may cause an output signal level to be readily saturated even with a relatively small input signal. As a result, as shown in FIG. 2B, the dynamic range of the amplifier circuit becomes narrower so that the field strength detecting capability is degraded in a strong electric field. With an insufficient capability of the amplifier circuit for detecting field strength, a variety of controls based on detected field strength cannot be achieved with high accuracy.

In a radio communication apparatus, the majority of electric power is consumed by a transmitter section, particularly by a high frequency power amplifier. In order to effectively reduce the power consumption, an output to be transmitted should be set to the smallest possible value. However, a transmitted output, if set at a small value, will cause a contradiction in that it is quite difficult to stably ensure a constant communication quality when the radio communication apparatus is used in mobile applications.

SUMMARY OF THE INVENTION

It is an object of the present invention to provide techniques which enable the dynamic range for detecting the field strength of a received signal to expand such that a variety of controls can be highly accurately performed based on detected field strength, while maintaining a reduced noise figure in order to favorably perform demodulation and so on for the received signal.

It is another object of the present invention to provide a field strength detector circuit which has a low noise figure and a wide dynamic range.

It is a further object of the present invention to provide a radio communication apparatus which utilizes an output signal of the field strength detector circuit having a low noise figure and a wide dynamic range.

The above and other objects and features of the present invention will become apparent from the description of preferred embodiments when read in conjunction with the accompanying drawings.

From the invention disclosed in the present application, typical features will be described below in summary.

Apart from a first signal path for amplifying a received signal and transmitting the amplified received signal to a demodulator, a second signal path for transmitting the received signal is provided such that a detection signal extracted from the first signal path and a detection signal extracted from the second signal path are used to detect the field strength of the received signal. The first signal path is composed of circuits which give priority to the communication quality, while the second signal path is composed of circuits which give priority to the width of the dynamic range. The configuration described above allows the field strength of a received signal to be detected in a wider dynamic range, while amplifying the received signal to be transferred to the demodulator with a reduced noise figure.

In this manner, the present invention achieves its object of expanding the dynamic range for detecting the field strength of a received signal such that a variety of controls can be highly accurately performed based on the detected field strength, while maintaining a reduced noise figure and high sensitivity in order to favorably perform demodulation and so on for the received signal.

BRIEF DESCRIPTION OF THE DRAWINGS

FIGS. 1A and 1B are circuit diagrams showing an amplifier circuit for providing a wide dynamic range and an amplifier circuit for providing a reduced noise figure, respectively;

DESCRIPTION OF THE PREFERRED EMBODIMENTS

Figure 2A:
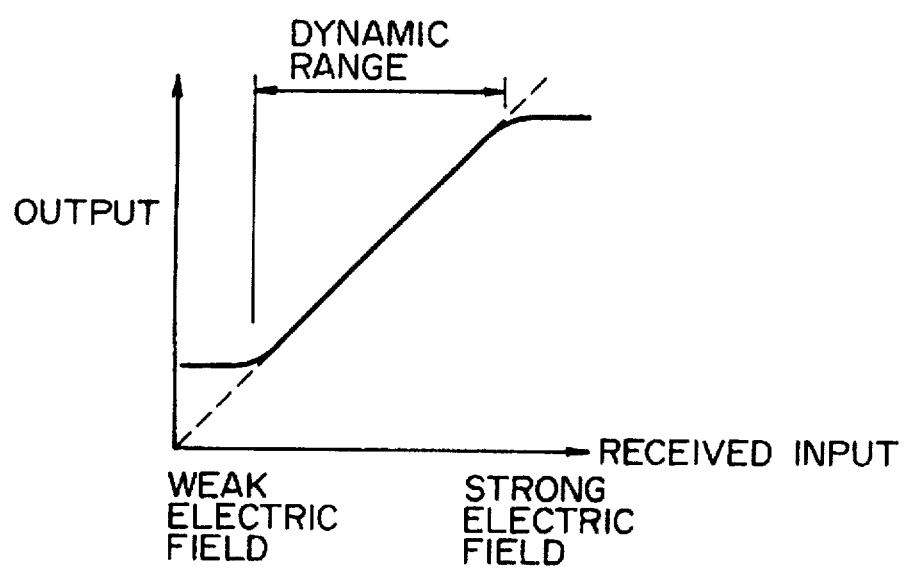
FIGS. 2A and 2B are graphs showing input/output characteristics of the amplifier circuits illustrated in FIGS. 1A and 1B, respectively.
Figure 2B:
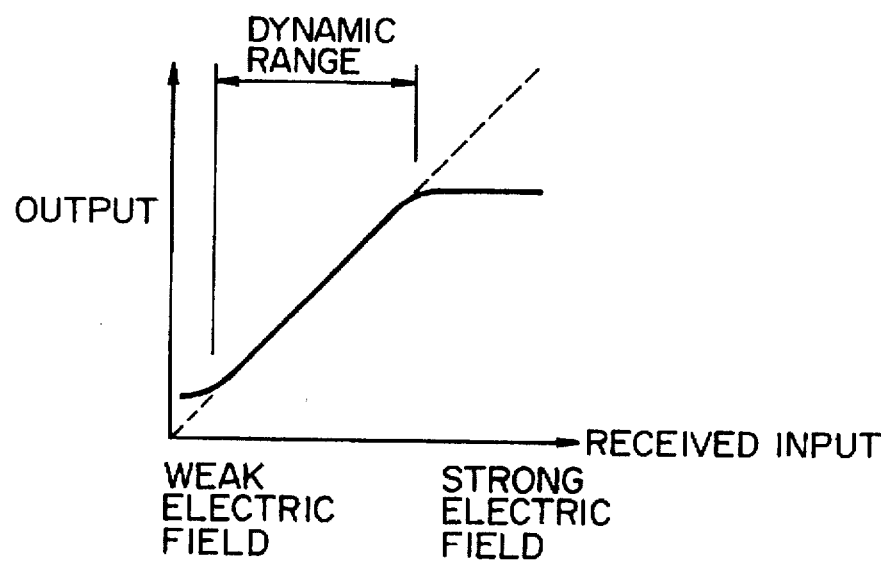

Preferred embodiments of the present invention will hereinafter be described with reference to the accompanying drawings. It should be noted first that identical reference numerals designate the same or corresponding parts in all these drawings.

Figure 3:
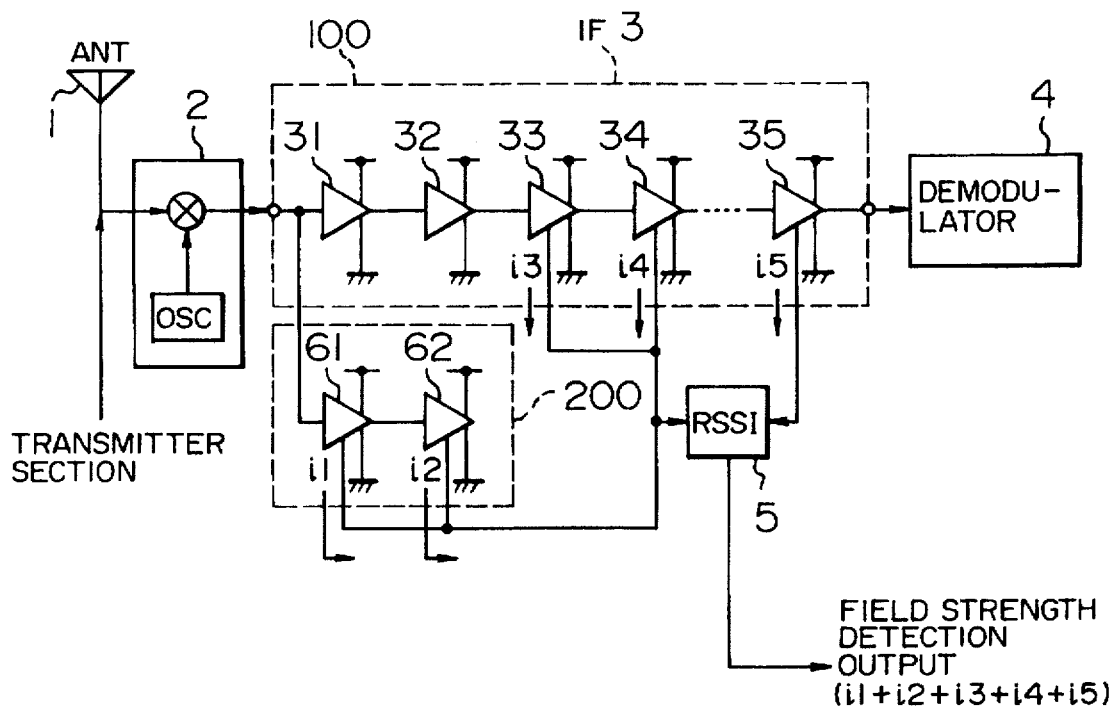
FIG. 3 is a block circuit diagram showing a first embodiment of a radio communication apparatus to which techniques of the present invention are applied.

FIG. 3 shows one embodiment of a main portion (receiver section) in a radio communication apparatus, to which techniques of the present invention are applied. The receiver section includes an antenna 1; a front end tuner (FET section) 2; an intermediate frequency amplifier (IF section) 3 for amplifying at multiple stages a received signal, which has its frequency converted by the FET section 2, in order to demodulate the received signal; a plurality of amplifier circuits 31–35 constituting amplification stages in the IF section 3; a demodulator 4; a signal strength detector circuit 5; and amplifier circuits 61, 62 arranged separately from the IF section 3 for amplifying the received signal at multiple stages. The amplifier circuit 35 at the last stage in the IF section 3 serves as a limiter amplifier.

In the above configuration, the amplifier circuits 31–35 in the IF section 3 constitute a first signal path 100, while the amplifiers 61, 62, arranged separately from the IF section 3, constitute a second signal path 200.

Each of the amplifier circuits 31, 32 at former stages is composed of circuits which give priority to a reduced noise figure and sensitivity, i.e., circuits which give priority to the communication quality, such as that shown in FIG. 1B. Each of the amplifier circuits 61, 62 in the second signal path 200 in turn is composed of circuits which give priority to the width of the dynamic range, such as that shown in FIG. 1A.

The signal strength detector circuit 5 detects the field strength of a received signal from detection signals (i3, i4, i5) extracted respectively from the amplifier circuits 33, 34, 35 at latter stages in the first signal path 100 and detection signals (i1, i2) extracted respectively from the amplifier circuits 61, 62 in the second signal path 200.

Though not particularly limited, the first signal path 100 and the second signal path 200 in FIG. 3 may be formed on a single silicon semiconductor chip as a monolithic semiconductor integrated circuit device.

Figure 5A:
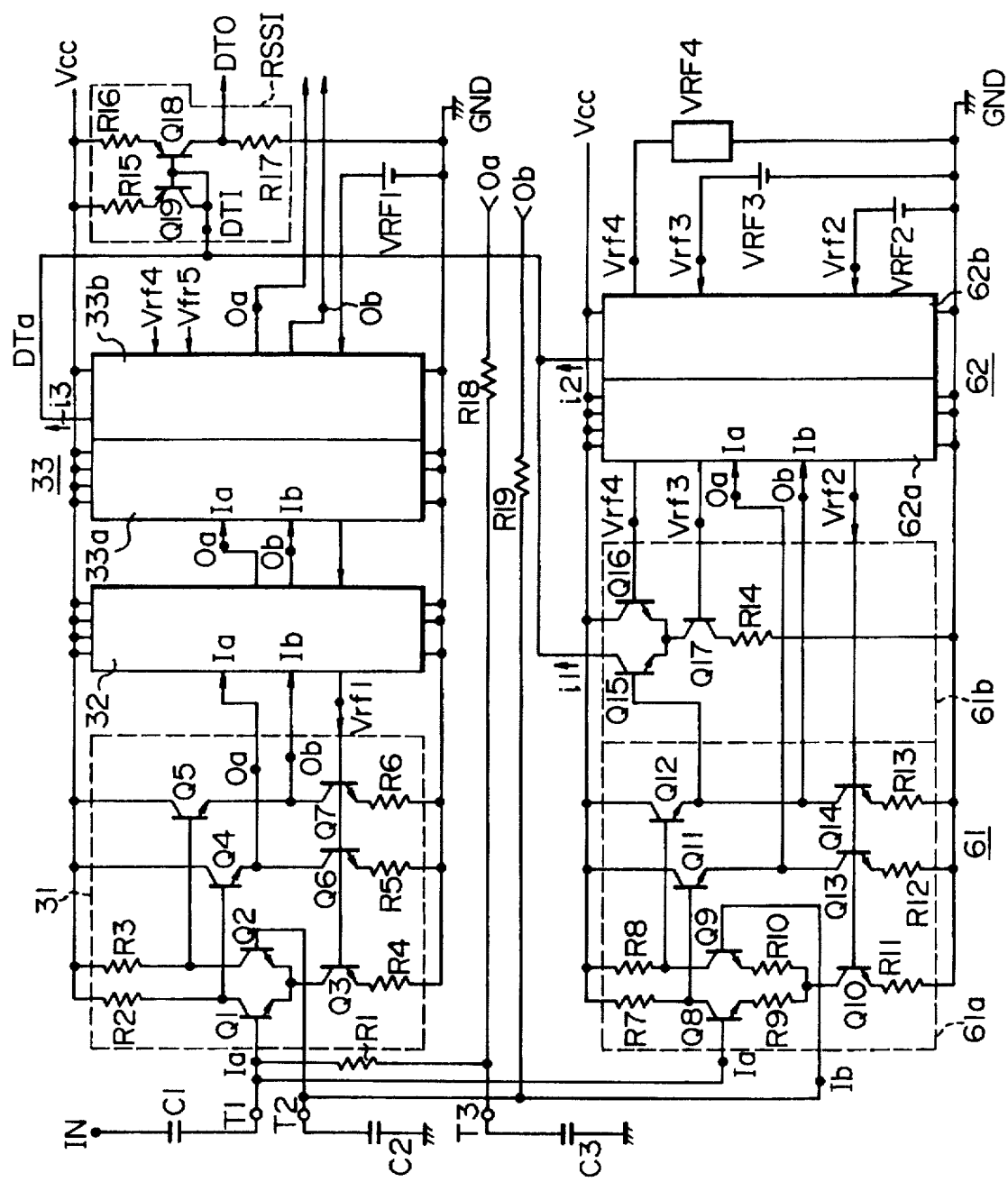
FIG. 5A is a circuit diagram showing in detail the apparatus illustrated in the block diagram of FIG. 3.

FIG. 5A is a circuit diagram showing in detail a circuit portion including the amplifier circuits 31, 32, 33, 61, 62 constituting the first signal path 100 and the second signal path 200. A signal (IN) outputted from the front end tuner 2 in FIG. 3 is supplied through a coupling capacitor C1 for cutting a direct current component to an external terminal T1 of the semiconductor integrated circuit device. The external terminal T1 is coupled to first input terminals of the amplifier circuit 31 at the first stage in the first signal path 100 and the amplifier circuit 61 at the first stage in the second signal path 200.

The plurality of cascade connected amplifier circuits constituting the first signal path 100 form a direct-coupled multi-stage amplifier circuit.

The amplifier circuit 31 at the first stage is composed of a pair of differentially amplifying transistors Q1, Q2; collector load resistors R2, R3, arranged between the collectors of the respective differential amplifying transistors Q1, Q2 and a power supply terminal Vcc; a differential amplification stage including a constant current transistor Q3 and an emitter resistor R4; a pair of emitter follower transistors Q4, Q5; and an emitter follower output stage including a pair of constant current transistors Q6, Q7 and emitter resistors R5, R6. Though not particularly limited, a constant current source composed of the constant current transistor Q3 and its emitter resistor R4; a bias current source composed of Q6 and R5; and a bias current source composed of Q7 and R6 may be all operated with a common bias voltage Vrf1. This bias voltage Vrf1 is formed by a common reference voltage source VRF1 which is arranged within the same semiconductor integrated circuit device and operated with a power supply voltage supplied to the power supply terminal Vcc.

In the illustrated configuration, the bases of the differential amplifier transistors Q1, Q2 constitute first and second input terminals Ia, Ib of the differential inputs, respectively. The emitter of the emitter follower transistor Q4 constitutes a first output terminal Oa for outputting a signal in a phase reverse to the first input terminal Ia, while the emitter of the transistor Q5 constitutes a second output terminal Ob for outputting a signal in phase with the first input terminal Ia.

In the amplifier circuit 31, the differentially amplifying transistors Q1, Q2 have their emitters directly connected to the constant current source without emitter resistors, as illustrated. This configuration can prevent noise which would be generated due to emitter resistors, so that low-noise amplification can be accomplished, i.e., a good noise figure is presented.

The amplifier circuit 32 at the next stage, though its details are not shown, has the same configuration as the amplifier circuit 31, and first and second input terminals Ia, Ib thereof are connected to the first and second output terminals Oa, Ob, respectively.

The amplifier circuit 33 at the third stage is composed of an amplification stage 33a and a detection stage 33b.

The amplification stage 33a has a configuration of a differential amplifier circuit, and first and second input terminals Ia, Ib thereof are connected to first and second output terminals Oa, Ob of the amplifier circuit 32, respectively.

As is well known in a multi-stage amplifier circuit, the noise figure of the first stage amplifier circuit most largely affects the noise figure of the entire multi-stage amplifier circuit, and the noise figures of respective amplifier circuits at latter stages exert less influence on the noise figure of the entire multi-stage amplifier circuit. The amplification stage 33a in the third stage amplifier circuit 33 is designed in consideration of the influence of its noise figure and appropriate detection characteristics to be provided for detecting the field strength in a wide field strength changing range from a weak electric field to a strong electric field. Thus, though not particularly limited, the amplification stage 33a in the third stage amplifier circuit 33 is configured to form a differential amplifier identical to the amplifier circuits 31, 32 at the former stages, and is additionally provided with emitter resistors connected to the emitters of respective differentially amplifying transistors, similarly to an amplification stage 61a, later explained.

The detection stage 33b, though its details are not illustrated, has a configuration similar to that of a detection stage 61b, later explained. Specifically, the detection stage 33b receives an output of the amplification stage 33a and delivers a detection output at its output terminal DTa.

The amplifier circuit 34 illustrated in FIG. 3 has a similar configuration as the amplifier circuit 33 in FIG. 5A. Specifically, first and second input terminals of an amplification stage thereof are connected to first and second output terminals Oa, Ob of the amplification stage in the amplifier circuit 33, respectively.

Referring back to FIG. 5A, a first bypass capacitor C3 arranged between an external terminal T3 and a reference potential point of the circuit, a bias resistor R18 having one end connected to the capacitor C3, a second bypass capacitor C2 arranged between an external terminal T2 and the reference potential point of the circuit, a bias resistor R19 having one end connected to the capacitor C2, and a bias resistor R1 constitute a bias circuit. The input side of the bias circuit, i.e., the other terminal of the bias resistor R18 and the other terminal of the bias resistor R19 are coupled to output terminals Oa, Ob of the amplifier circuit 34 (FIG. 3) at the fourth stage, respectively. With this configuration, the first and second input terminals Ia, Ib of the first stage amplifier circuit 31 are applied with a bias voltage, thus providing a DC negative feedback bias voltage to the multi-stage amplifier circuit.

The plurality of amplifier circuits constituting the second signal path also form a direct coupled multi-stage amplifier circuit similar to those of the first signal path.

The amplifier circuit 61 in FIG. 5A is composed of an amplification stage 61a and a detection stage 61b.

Though not particularly limited, the amplification stage 61a has substantially the same configuration as the amplifier circuits 31, 32, except that emitter resistors R9, R10 are inserted between the emitters of respective differentially amplifying transistors Q8, Q9 and the collector of the constant current transistor Q10. The collectors of transistors $Q_8$ and $Q_9$ are respectively connected to supply voltage $V_{ec}$ via resistors $R_7$, $R_8$. Its first input terminal Ia is coupled to the external terminal T1, while its second input terminal Ib is connected to the external terminal T2 so as to receive a bias voltage common to that applied to the second input terminal Ib of the amplifier circuit 31. The provision of the emitter resistors R9, R10 allows the amplification stage 61a to have a wider input dynamic range, although its signal amplification factor is limited thereby.

The detection stage 61b is composed of differentially connected transistors Q15, Q16; a constant current transistor Q17; and an emitter resistor R14. The differentially connected transistors Q15, Q16 are respectively applied with their operating current by a constant current source composed of the resistor R14 and the constant current transistor Q17 which is applied with a reference voltage (bias voltage) Vrf3 from a reference voltage source VRF3.

Figure 5B:
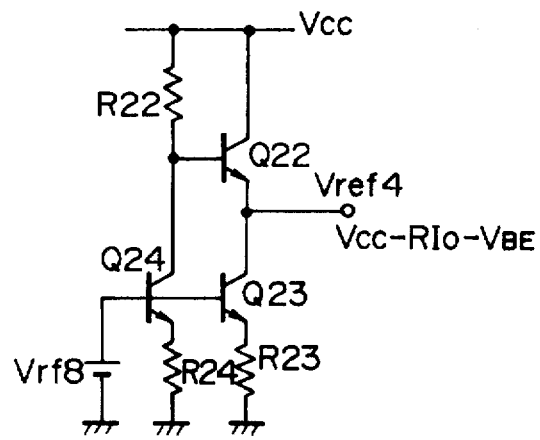
FIGS. 5B and 5C are circuit diagrams respectively showing in detail a reference voltage source 4 in FIG. 5A.
Figure 5C:
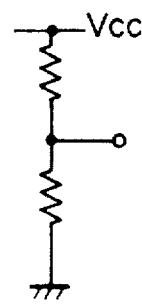

One of the differentially connected transistors Q15, Q16, for example, the transistor Q15, having its base coupled to the emitter of an emitter follower transistor Q12 serving as a second output terminal Ob of the amplification stage 61a, constitutes a detection input transistor, the collector of which serves as an output terminal DTa of the detection stage 61b. The other transistor, i.e., the transistor Q16 having its base coupled to a reference voltage source VRF4 constitutes a transistor for setting a detection level. FIGS. 5B and 5C show examples of suitable circuit diagrams for reference voltage source VRF4.

The value of a reference voltage Vrf4 applied from the reference voltage source VRF4 to the base of the detection level setting transistor Q16 is set to a level substantially equal to such a level that maintains the transistor Q15 in off-state and the detection level setting transistor Q16 in on-state, with respect to the output potentials at the first and second output terminals Oa, Ob of the amplification stage 61a, in a non-signal state in which no input signal is being applied to the first and second input terminals Ia, Ib of the amplification stage 61a. In addition, when the output potential at the second output terminal Ob of the amplification stage 61a increases in the positive direction during signal input, the level of the reference voltage Vrf4 causes a current to start flowing into the detection input transistor Q15 in proportion to the increase of the output potential in the positive direction. Stated another way, the reference voltage Vrf4 is different from such an ordinary bias voltage as that applied to a normal differential amplifier circuit for maintaining differential transistors in a balanced operation state, but is a bias voltage which is offset to a relatively high level side such that a signal input causes the detection input transistor, which remains in off-state while no signal is applied, to transit to on-state.

The reference voltage source VRF4 for generating a critical bias voltage may be formed of a circuit using transistors for applying a constant voltage as shown in FIG. 5B or a resistive potential divider circuit as shown in FIG. 5C including a potential dividing resistor connected in series between a power supply terminal and a reference potential terminal. In FIG. 5B, reference voltage Vrf4 is generated at the emitter and collector of transistors $Q_{22}$ and $Q_{23}$, respectively. The collector of transistors $Q_{22}$ is connected to power supply $V_{cc}$, and the bases of transistors $Q_{22}$ is connected to $V_{cc}$ via a resistors $R_{22}$. The emitter of transistor $Q_{23}$ is grounded via a resistor $R_{23}$, and the base of transistor $Q_{23}$ is connected to the base of a transistor $Q_{24}$ and to reference voltage source Vrf8. The collector of transistor $Q_{24}$ is connected to the base of transistor $Q_{22}$ and to resistor $R_{22}$, and the emitter of transistor $Q_{24}$ is grounded via a resistor $R_{24}$. A constant voltage circuit as shown in FIG. 5B exhibits extremely few changes in its input operation point even with changes in operation temperature. However, while a constant voltage circuit as shown in FIG. 5C may be formed of a circuit of a relatively simple configuration such as a resistive potential divider circuit, its input operation point may vary due to changes in operation temperature, so that special attention should be paid to its use.

With the operating point of the amplification stage 61a and the reference voltage Vref4 set as described above, the detection stage 61b is operative during a one-half positive cycle period of an amplified signal appearing at the second output terminal Ob of the amplification stage 61a to permit a current having a level proportional to the level of the amplified signal to flow to its detection output terminal DTa. Thus, an average DC current flowing to the detection output terminal DTa has a level proportional to the level of the amplified signal.

The amplifier circuit 62 at the next stage in the second signal path is composed of an amplification stage 62a and a detection stage 62b which are configured similarly to those of the amplifier circuit 61. First and second input terminals Ia, Ib of the amplification stage 62a are connected to the first and second output terminals Oa, Ob, respectively, of the amplifier circuit 61 at the previous stage.

A current source in the amplification stage 62a, not shown, has a configuration similar to that of the current source in the amplification stage 61a, that is, a circuit composed of transistors Q13, Q10, Q14 and resistors R11, R12, R13 for generating a reference voltage Vrf2 for the amplification stage 61a. Both the amplification stages 61a, 62a are operated with the reference voltage Vrf2 from the common reference voltage source VRF2. Since the amplification stage 62a is not connected to any circuit receiving outputs thereof, it does not require any output terminal for delivering a signal.

The detection stages 61b, 62b have a common current source which is operated with the reference voltage Vrf3 from the common reference voltage source VRF3. A critical level required in their detection is also made common to the level Vrf4. A detection output terminal DTa of the detection stage 62b is commonly connected to an input terminal DTI of the signal strength detector circuit 5 together with output terminals of other detection stages.

Though not particularly limited, in this embodiment, the first and second input terminals Ia, Ib of the first stage amplifier circuit 61 forming part of the second signal path are connected directly to the first and second input terminals Ia, Ib of the amplifier circuit 31 forming part of the first signal path, respectively. With this configuration, the first and second input terminals of the first stage amplifier circuit 61 are applied with a bias voltage from a negative feedback circuit in the first signal path. In this event, the respective amplifier circuits constituting the first signal path are as a whole placed in an appropriately biased state by the bias voltage produced by the negative feedback configuration as described above, irrespective of offset voltages caused by variations in the characteristics of the respective differentially amplifying transistors and of collector load resistors in the respective amplifier circuits.

On the other hand, a bias voltage applied to the input of the amplifier circuit 61 forming part of the second signal path is not related to the negative feedback bias loop in the first signal path, so that the stabilization of the operating point realized by the negative feedback operation would not be expected. However, in this embodiment, since the second signal path has emitter resistors, it is accordingly made insensitive to small input offsets of the bias voltage delivered from the first signal path. For this reason, the bias voltage from the first signal path is additionally utilized as a bias voltage for the second signal path. Advantageously, this configuration requires far fewer externally connected elements such as coupling capacitors, bypass capacitors, and so on, which are added externally to a semiconductor integrated circuit device, as compared with alternatively possible configurations (for example, a configuration which includes an additional negative feedback bias circuit dedicated to the second signal path, other than the negative feedback circuit in the first signal path, and inputs a signal to the second signal path through a coupling capacitor for cutting a direct current component of the signal).

As is apparent from the illustrated configuration of the detection stage 61b, which represents all the detection stages in the first and second signal paths, the outputs of the respective detection stages are in the form of a current, so that they may be easily combined (added) by simple wired coupling (wire connection).

In this case, the operating currents and amplification factors have previously been set appropriately to the respective amplifier circuits in the first and second signal paths, such that when an input signal applied to the external terminal T1 is gradually increasing from a weak level, the amplifier circuit 35 at the fifth stage in the first signal path first presents an amplified output reaching its maximal amplitude; the amplifier circuit 34 at the fourth stage next presents an amplified output reaching its maximal amplitude; the amplifier circuit 33 at the third stage next presents an amplified output reaching its maximal amplitude; and the amplifier circuit 62 in the second stage in the second signal path presents an amplified output reaching its maximal amplitude. This design enables the field strength to be smoothly detected even if the field strength changes over a wide range from a low level to a high level.

More specifically, if an input signal at a weak level is applied to the external terminal T1, the largest amplified signal appears at the output of the amplifier circuit 35 at the fifth stage forming part of the first signal path. Therefore, in this case, since an amplified output of the amplifier circuit 34 at the fourth stage and amplified outputs of the amplifier circuits 61, 62 at the second and previous stages in the second signal path are still at low levels, a combined detection output is mainly determined by the detection output of the amplifier circuit 35 at the fifth stage.

Next, when the level of the signal applied to the external terminal T1 becomes a bit higher to cause an amplified output of the amplifier circuit 35 at the fifth stage to reach its maximal amplitude, the amplifier circuit 35 at the fifth stage generates a constant detection output in accordance with the maximal amplitude. In this event, if an amplified output of the amplifier circuit 34 at the fourth stage in the first signal path has not reached its maximal amplitude, a detection output from the amplifier circuit 34 at the fourth stage begins to change in proportion to the increasing input signal level. At this point, a detection output from the second signal path still remains at a relatively low level. Therefore, the combined detection output produced at this point is substantially the sum of the constant detection output from the amplifier circuit 35 at the fifth stage and the detection output from the amplifier circuit 34 at the fourth stage which changes in proportion to the input signal level. Therefore, the level of the combined detection output is changed depending on the detection output from the amplifier circuit 34 at the fourth stage.

When the input signal level has further increased to cause the amplified outputs of fifth and fourth and third amplifier circuits 35, 34, 33 to reach their respective maximal amplitudes, the combined detection output is produced by the sum of the constant detection outputs of the fifth, fourth and third amplifier circuits 35, 34, 33 and a detection output from the amplifier circuit 62 at the second stage forming part of the second signal path, which has a level proportional to the input signal level. Therefore, the level of the combined detection output is changed depending on the detection output from the amplifier circuit 62 at the second stage of the second signal path.

When the output of the amplifier circuit 62 at the second stage forming part of the second signal path has also reached its maximal amplitude, the combined detection output is produced by the sum of the constant detection outputs from the respective amplifier circuits 35, 34, 33, 62 and a detection output of the amplifier circuit 61 having a level proportional to the input signal level. Therefore, the level of the combined detection output is changed in proportion to the detection output from the amplifier circuit 61.

In this embodiment, the signal strength detector circuit 5 is composed of a current mirror circuit including npn transistors Q18, Q19 and emitter resistors R15, R16, and a load resistor R17 thereof, as shown in FIG. 5A, so as to deliver a detection output at its output terminal DTO with a potential across the load resistor R17 being a reference potential of the circuit.

As is apparent from the foregoing explanation, the total detection output is produced by a wired adder circuit which commonly connects the outputs of the respective detection stages to calculate the sum of these outputs. The reference potential point may be set at the ground level GND as illustrated or at any other constant potential level. The wired adder circuit, i.e., wire connection itself may be regarded as the signal strength detector circuit 5 in FIG. 1.

The operation of the entire radio communication apparatus shown in FIG. 3 will be next explained.

A received signal is amplified and transferred by the first signal path 100 to the demodulator 4 as well as branched to the second signal path 200 separate from the first signal path 100.

Detection signals (i3, i4, i5) respectively generated from the amplifier circuits 33, 34, 35 at the latter stages among the amplifier circuits 31–35 in the first signal path 100, and detection signals (i1, i2) generated from the amplifier circuits 61, 62 in the second signal path 200, are added to each other to produce a combined detection output which is inputted to the signal strength detector circuit 5.

The signal strength detector circuit 5 performs processing such as smoothing and so on for the combined detection signal (i1+i2+i3+i4+i5) to output a voltage signal indicative of a detected field strength of a received signal at a DC level. This received field strength detection output is used for a variety of controls such as a search for an optimal received frequency and so on, though illustration is omitted.

In the radio communication apparatus described above, the amplifier circuits 31, 32 at the former stages in the first signal path 100 constitute circuits which give priority to reduced noise figure and higher sensitivity, so that a received signal to be transferred to the demodulator can be amplified by these amplifier circuits 31, 32 with a reduced noise figure and high sensitivity, thus making it possible to favorably perform demodulation and so on for the received signal.

Figure 4:
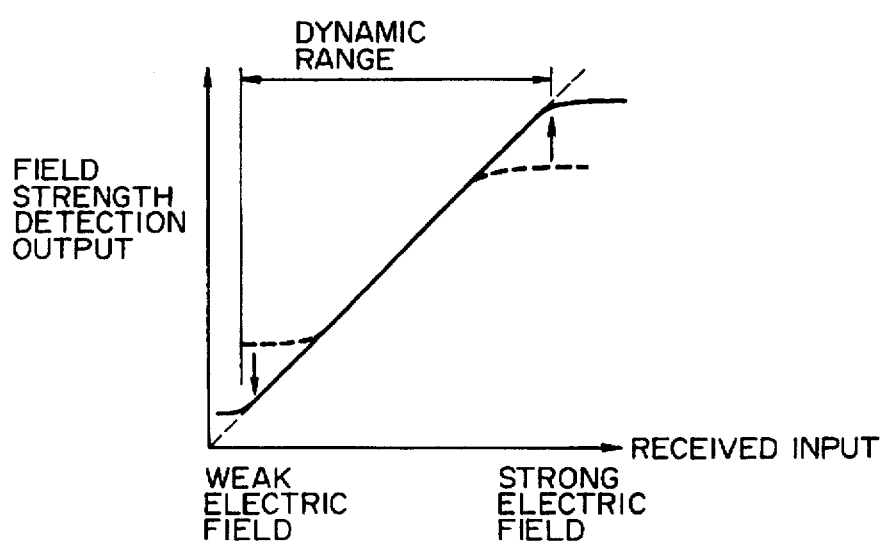
FIG. 4 is a graph showing dynamic ranges of the apparatus illustrated in FIG. 3 for detecting the field strength of a received signal.

On the other hand, since the amplifier circuits 61, 62 in the second signal path 200 constitute circuits which give priority to wider dynamic range, the detection of the field strength of a received signal using the detection signals (i1, i2) from the amplifier circuits 61, 62 can be carried out over a wide dynamic range, as shown in FIG. 4.

In this way, the radio communication apparatus of this embodiment enables the dynamic range for detecting field strength of a received signal to expand, while ensuring a reduced noise figure and higher sensitivity for favorably performing demodulation and so on for the received signal, so that a variety of controls can be highly accurately accomplished based on the field strength thus detected over the expanded dynamic range.

Figure 6:
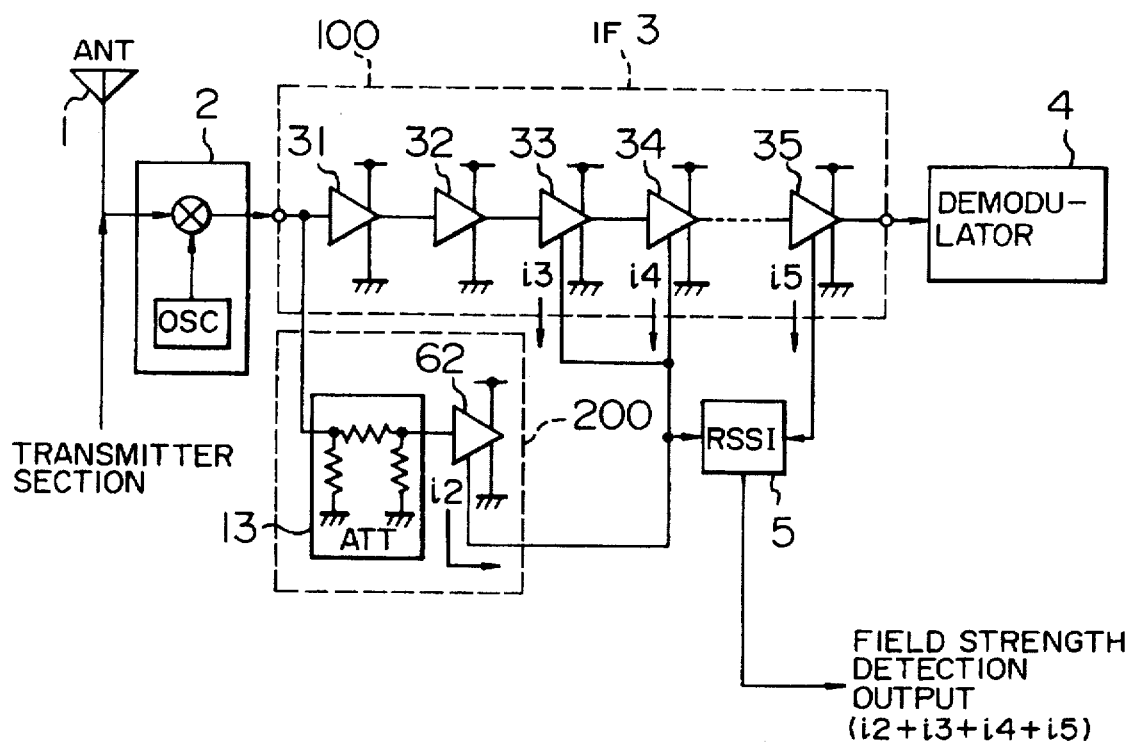
FIG. 6 is a block circuit diagram showing a second embodiment of the present invention.

FIG. 6 shows a second embodiment of the present invention.

In the second embodiment, a second signal path 200 dedicated to detection of the field strength of a received signal is composed of an attenuator 13 and an amplifier circuit 62 having a wide dynamic range. The attenuator 13 is located on the input side of a received signal transferred to the second signal path 200. This results in further expanding the dynamic range for detecting the field strength of a received signal. Particularly, the dynamic range is largely expanded in the strong field direction.

Figure 7:
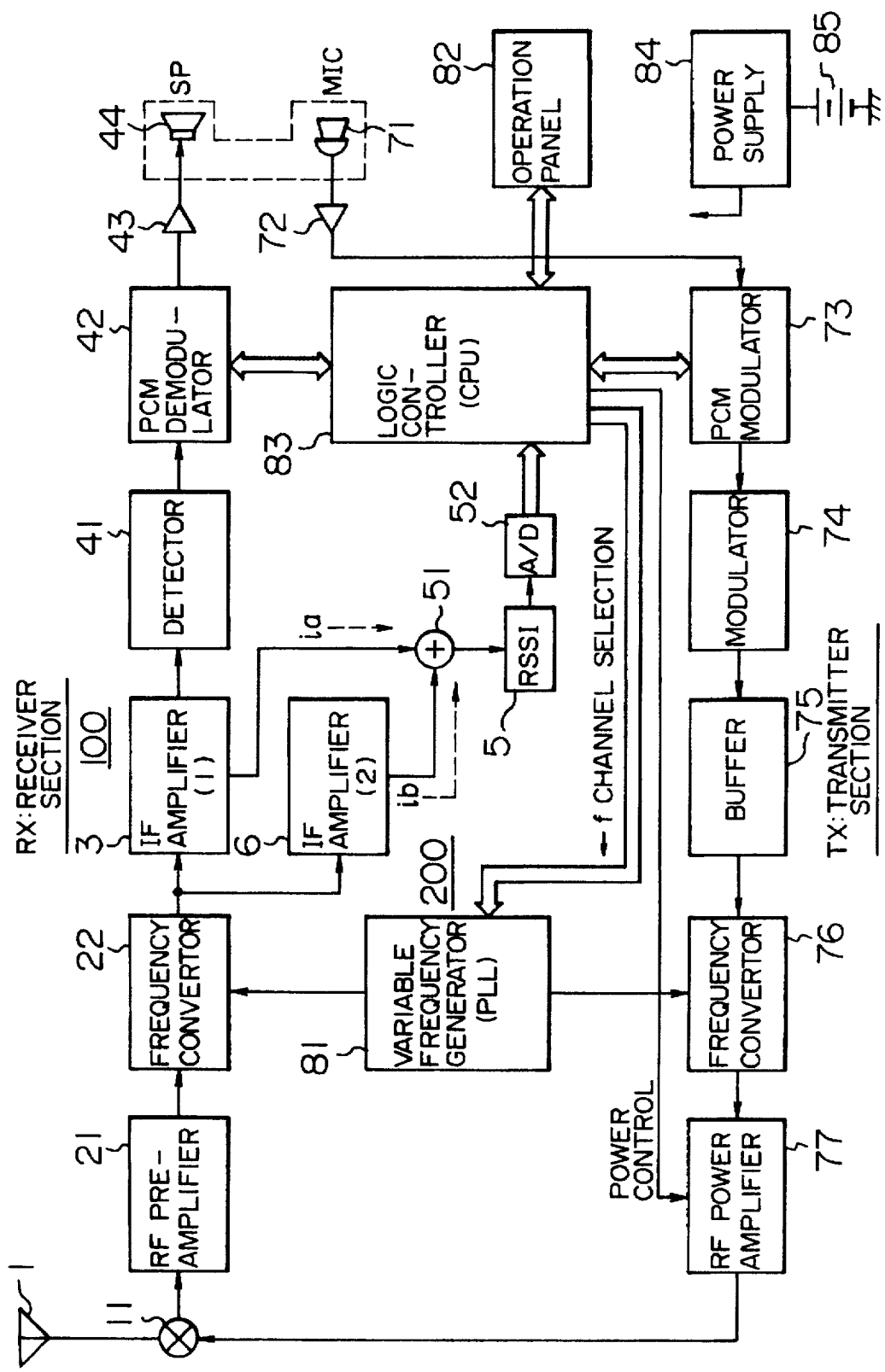
FIG. 7 is a block circuit diagram showing a first embodiment of a cellular telephone to which the radio communication apparatus of the present invention is applied.

FIG. 7 shows an embodiment of a portable cordless telephone of a zone selection type, i.e., a so-called cellular telephone to which the radio communication apparatus of the present invention is applied.

Figure 8A:
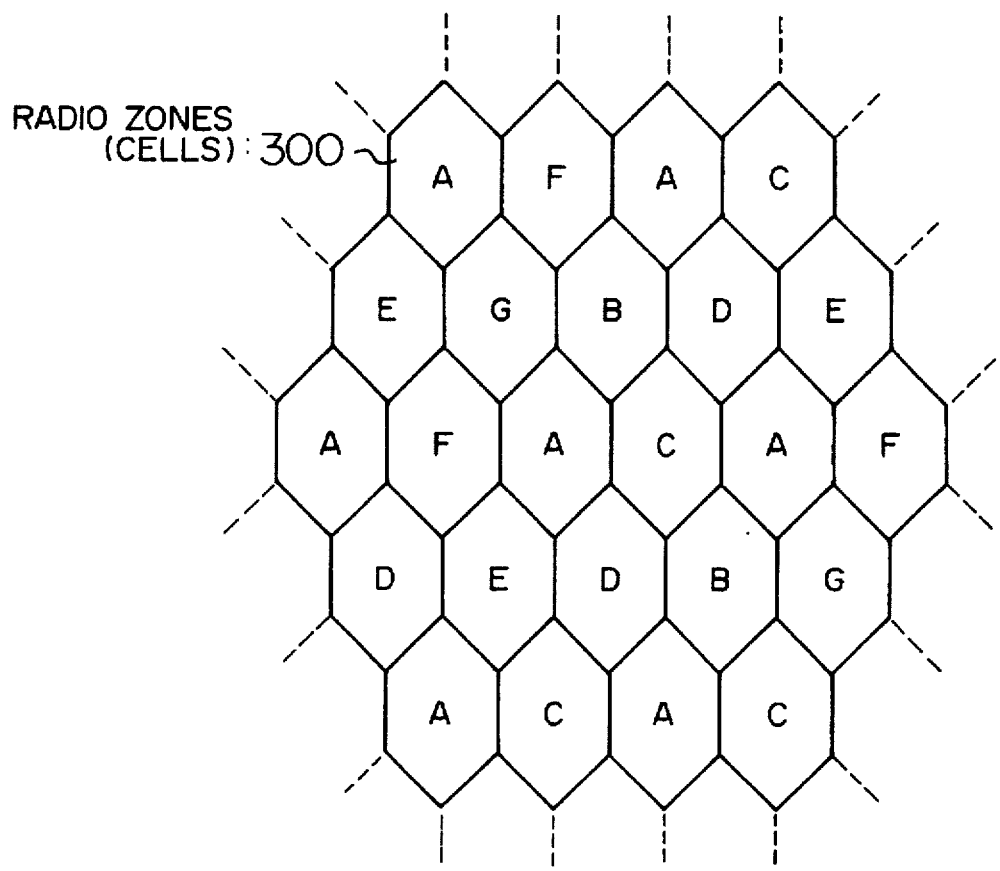
FIGS. 8A and 8B are diagrams showing wide radio zones (cells) and narrow radio zones (cells), respectively.
Figure 8B:
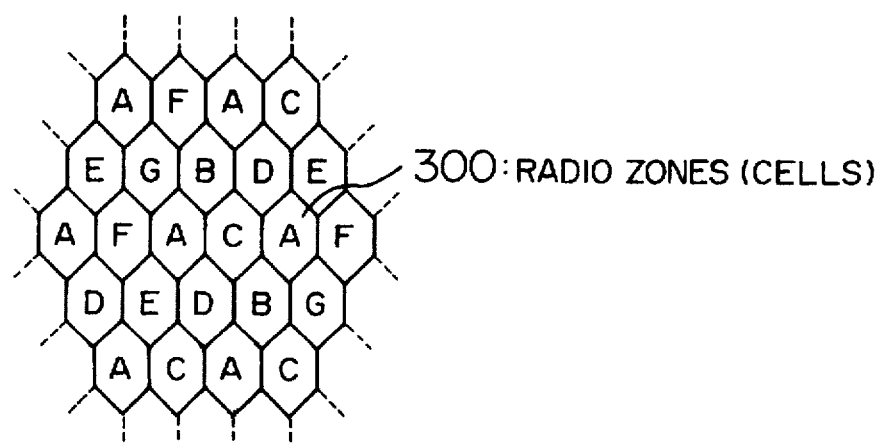

A radio communication apparatus illustrated in FIG. 7 has a radio receiver section RX; a radio transmitter section TX; a signal strength detector circuit 5 for detecting the field strength of a received signal; a logic controller 83 for variably controlling a radio transmitted output in the radio transmitter section TX based on an output of the signal strength detector circuit 5; a power supply circuit 84 employing a battery 85 as a main power supply source; and other illustrated functional blocks. This radio communication apparatus is used in a communication network formed of radio zones (cells) 300 as shown in FIGS. 8A and 8B.

The radio receiver section RX is composed of a high frequency signal amplifier (RF front end) 21 for preliminarily amplifying a received signal inputted thereto from an antenna 1 through a branching filter 11; a frequency convertor (down convertor) 22 for converting the preliminarily amplified received signal to an intermediate frequency signal (IF signal) in a predetermined frequency region by a local oscillating frequency signal (local signal) applied thereto from a variable frequency signal generator circuit 81; an intermediate frequency amplifier (IF section) 3 for amplifying the converted IF signal at multiple stages; an FM detector 41 for demodulating modulated signal components from the amplified IF signal; a PCM demodulator 42 for performing demodulation of a received speech signal from the demodulated modulated signal components, discrimination of digital control signals, and so on; a low frequency power amplifier 43 for amplifying the demodulated received speech signal; a speaker 44 for generating sound reproduced from the amplified received speech signal; and so on.

The radio transmitter section TX is composed of a PCM modulator 73 for pulse-coding a speech signal to be transmitted, which is inputted thereto from a microphone 71 through a low frequency pre-amplifier 72, and for performing orthogonal amplitude modulation with this pulse-coded speech signal; an FM modulator 74 for modulating an intermediate frequency carrier (baseband carrier) with an output signal of the PCM modulator 73; an amplifier (buffer) 75 for buffering and amplifying a modulated intermediate frequency signal (IF signal); a frequency convertor (up convertor) 76 for converting the amplified IF signal to a high frequency signal in a predetermined frequency region with a local oscillating frequency signal (local signal) applied thereto from a variable frequency generator circuit 81; a high frequency power amplifier 77 for amplifying the power of the converted high frequency signal and supplying the amplified high frequency signal to the antenna 1 through the branching filter 11; and so on. The high frequency power amplifier 77 used in this radio transmitter section is configured to be variably controlled such that its transmitted output varies in accordance with transmitted distance.

The signal strength detector circuit for detecting the field strength of a received signal is composed of a first signal path 100 constituting the IF section 3 of the radio receiver section RX; a second signal path 200 formed of the IF section 6 for amplifying the received signal, separately from the IF section 3; a wired adder circuit 51 for adding a detection signal (ia) extracted from the first signal path 100 and a detection signal (ib) extracted from the second signal path 200 to produce a combined detection signal; a signal strength detector circuit 5 for performing processing such as smoothing for the combined detection signal (ia+ib) to output a voltage signal indicative of the field strength of a received signal at a DC level; and so on.

In this configuration, the first signal path 100 is composed of circuits which give priority to reduced noise figure and higher sensitivity, while the second signal path 200 is composed of circuits which give priority to wider dynamic range. Also, the output of the signal strength detector circuit 5 is converted to a digital signal by an A/D convertor 52 and delivered to the logic controller 83, later described.

The logic controller 83 is formed of a computer integrated in a micro circuit and performs network controls such as selection of a radio zone and optimal control for a radio transmitted output, based on information inputted through manipulations of an operation panel 82, digital control signals discriminated by the radio receiver section RX, and the field strength of a received signal detected by the signal strength detector circuit 5.

The variable frequency generator circuit 81 is formed of a phase lock loop (PLL), and generates a local oscillating frequency signal (local signal) for determining a received frequency and transmitted frequency based on the frequency of a quartz oscillator (not shown) under control of the logic controller 83.

The logic controller 83 is configured to perform the selection of a radio zone and the optimal control for a radio transmitted output by using the field strength of a received signal as a main control information source. More specifically, a radio zone is selected from comparison of the field strengths of received signals from base stations in several radio zones, which have been detected by the signal strength detector circuit 5. Also, a radio output to be transmitted to a base station in a selected radio zone is increased or decreased in accordance with the field strength of a received radio signal transmitted from the base station. Stated another way, the logic controller 83 performs such a control that a radio output to be transmitted is increased responsively if the field strength of a received signal, detected by the signal strength detector circuit 5, presents a low level, and that the radio output to be outputted is reduced responsively if the field strength presents a high level.

In this way, when the radio communication apparatus of this embodiment is located relatively remote from a base station, its radio transmitted output is increased to ensure a predetermined communication quality. On the other hand, when the radio communication apparatus is located relatively near a base station, its radio transmitted output is reduced to minimize the consumption of the battery 85 spent for the transmission. In addition, effective utilization of frequencies can be achieved thanks to an interference disturbed range which is narrowed on the same channel (or at the same frequency) and so on.

As described above, the radio communication apparatus of the embodiment shown in FIG. 7 enables a stable communication quality to be ensured without difficulties in situations wherein the apparatus is used for mobile applications. Also, electric power consumed thereby is reduced, so that if a battery is used as a power source, its service life can be extended.

The radio communication apparatus of the embodiment shown in FIG. 7 further has the following effects in addition to those described above.

First, with the provision of the first signal path 100 for amplifying and transferring a radio received signal from the antenna 1 and a second signal path 200 for transferring the radio received signal separately from the first signal path 100 so as to detect the field strength of the received signal from a detection signal (ia) extracted from the first signal path 100 and a detection signal (ib) extracted from the second signal path 200, wherein the first signal path 100 is composed of circuits which give priority to reduced noise figure and higher sensitivity, i.e., which give priority to communication quality, while the second signal path 200 is composed of circuits which give priority to wider dynamic range, the field strength of received signals can be precisely detected over a very wide range from a weak electric field to a strong electric field. In this way, a variable control for a transmitted output, based on a detected field strength value, can be properly achieved over a wide range. Therefore, as shown in FIG. 9C, the transmitted output thus optimized neither more nor less results, with extremely high reliability, in a high communication quality that can be stably ensured, minimal consumption of the battery, and suppression of unnecessary radiation of radio waves.

Figure 9A:
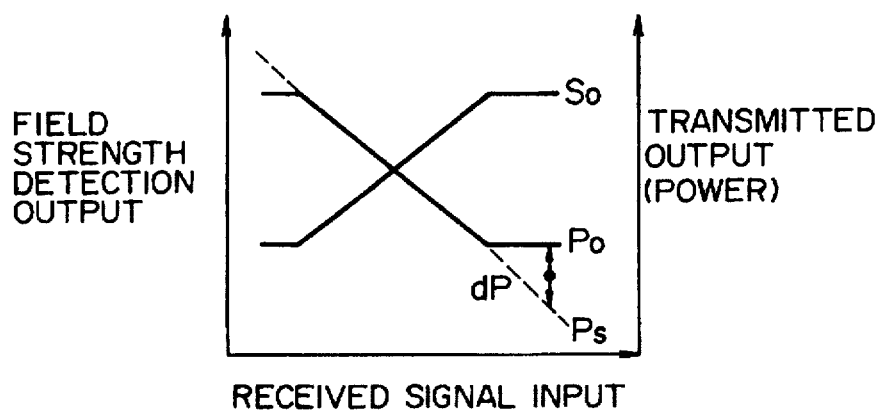
FIG. 9A is a graph for explaining a problem possibly occurring in a transmitted output when a narrow dynamic range is provided for detecting the field strength.
Figure 9B:
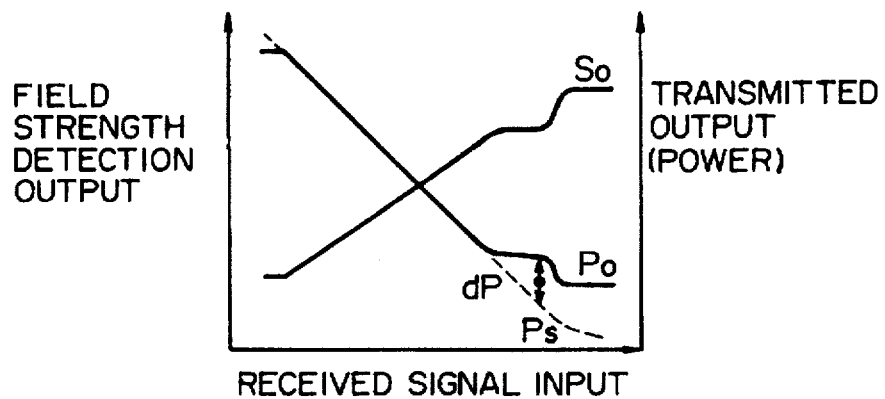
FIG. 9B is a graph for explaining a problem possibly occurring in a transmitted output when a detected field strength presents a bad linearity.
Figure 9C:
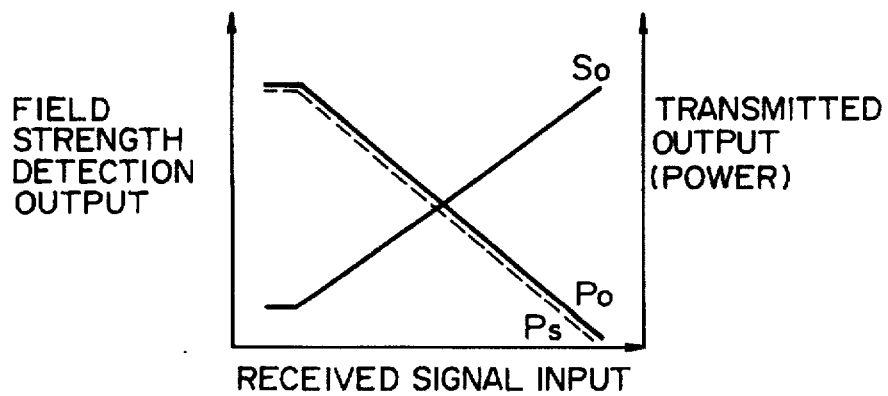
FIG. 9C is a graph for explaining a transmitted output produced when a wide dynamic range is provided for detecting the field strength with a detected field strength presenting a good linearity.

FIGS. 9A, 9B, 9C respectively show the relationship between a received signal from the antenna, a field strength detection output So, and a transmitted output Po variably set based on the field strength detection output So.

Specifically, FIG. 9A shows the relationship when the field strength detecting range, i.e., dynamic range is relatively narrow; FIG. 9B when the accuracy of the field strength detection is partially bad (the linearity of the field strength detection is bad); and FIG. 9C when the dynamic range as well as the accuracy are satisfactory to the field strength detection.

In FIG. 9A, when the radio communication apparatus is close to a base station in a radio zone, for example, so that sufficient communication quality may be ensured even with a small amount of power, an actual transmitted output Po largely exceeds a proper output Ps, with the result that the difference therebetween dP (dP=Po−Ps) ends up to be useless battery consumption and unnecessary radiation of radio waves.

Also, in FIG. 9B, in a portion where the field strength is not precisely detected, a difference (dP) between a received signal and a field strength detection output So ends up to be useless battery consumption and unnecessary radiation of radio waves.

FIG. 9C shows that the field strength is relatively precisely detected over a wide range from a strong electric field to a weak electric field, so that an optimal transmitted output Po can be variably set in a proper quantity, even if the radio communication apparatus is located near the boundary of a radio zone so that the sensitivity to received signals is low, or even if the radio communication apparatus is close to a base station in a radio zone so that the sensitivity to received signals is extremely high.

Further, the capability of precise field strength detection over a wide dynamic range, as shown in FIG. 9C, is highly advantageous in reducing the size of radio zones, as shown in FIGS. 8A, 8B.

As the size of a radio zone, i.e., the so-called cell size is smaller, the frequency utilization efficiency is advantageously improved. More specifically, the number of frequencies (channels) simultaneously usable in a radio zone is limited to a fixed number. Therefore, in relatively wide radio zones as shown in FIG. 8A, the fixed number of frequencies (channels) must be used in each of them. However, if narrower radio zones are provided as shown in FIG. 8B, the same number of frequencies (channels) can be used in the narrower radio zones. In other words, assuming that the size of a radio zone is reduced to a quarter that of an original radio zone, the number of frequencies (channels) available in the same size region can be increased to four times. This is extremely important to improve the utilization efficiency of frequencies, which are a limited resource.

However, if the radio zones are thus narrowed, grave problems to be solved are left behind.

Specifically explaining, in a narrower radio zone, the field strength of a received signal tends to change quite remarkably. Generally, the field strength of a received radio signal changes substantially in reciprocal proportion to the square of the distance from the transmitting base station to the radio communication apparatus. Assuming that the radio communication apparatus is located at a distance of 1000 meters from a transmitting base station, the field strength of a received signal will not change so much even if it moves 100 meters from there. Thus, a transmitted output need not be corrected so much in order to remain proper for maintaining a high communication quality. However, assuming that the distance therebetween is merely 100 meters, a significant change in the field strength of a received signal will result if the radio communication apparatus moves 100 meters from there. Thus, the transmitted output should also be substantially corrected in order to remain proper for maintaining communication quality.

As described above, while the provision of narrower zones is important and effective in improving the utilization efficiency of frequencies (channels), this advantage has not been so far utilized sufficiently due to significant changes in the field strength of received signals possibly occurring in such narrower radio zones.

If the field strength of a received signal is relatively precisely detected from a strong electric field to a weak electric field, as shown in FIG. 9C, such that an optimal transmitted output Po can be variably set neither more nor less respectively in the case where the radio communication apparatus is located near the boundary of a radio zone so that the sensitivity to received signals is low and for the case where the radio communication apparatus is close to a base station in a radio zone so that the sensitivity to received signals is extremely high, a high utilization efficiency of frequencies will be realized by a transmitted output thus properly set for any case, even if narrower radio zones are provided as shown in FIG. 8B.

It will be therefore appreciated that, according to the radio communication apparatus shown in FIG. 7, the utilization efficiency of frequencies can be improved by narrowing radio zones.

Figure 10:
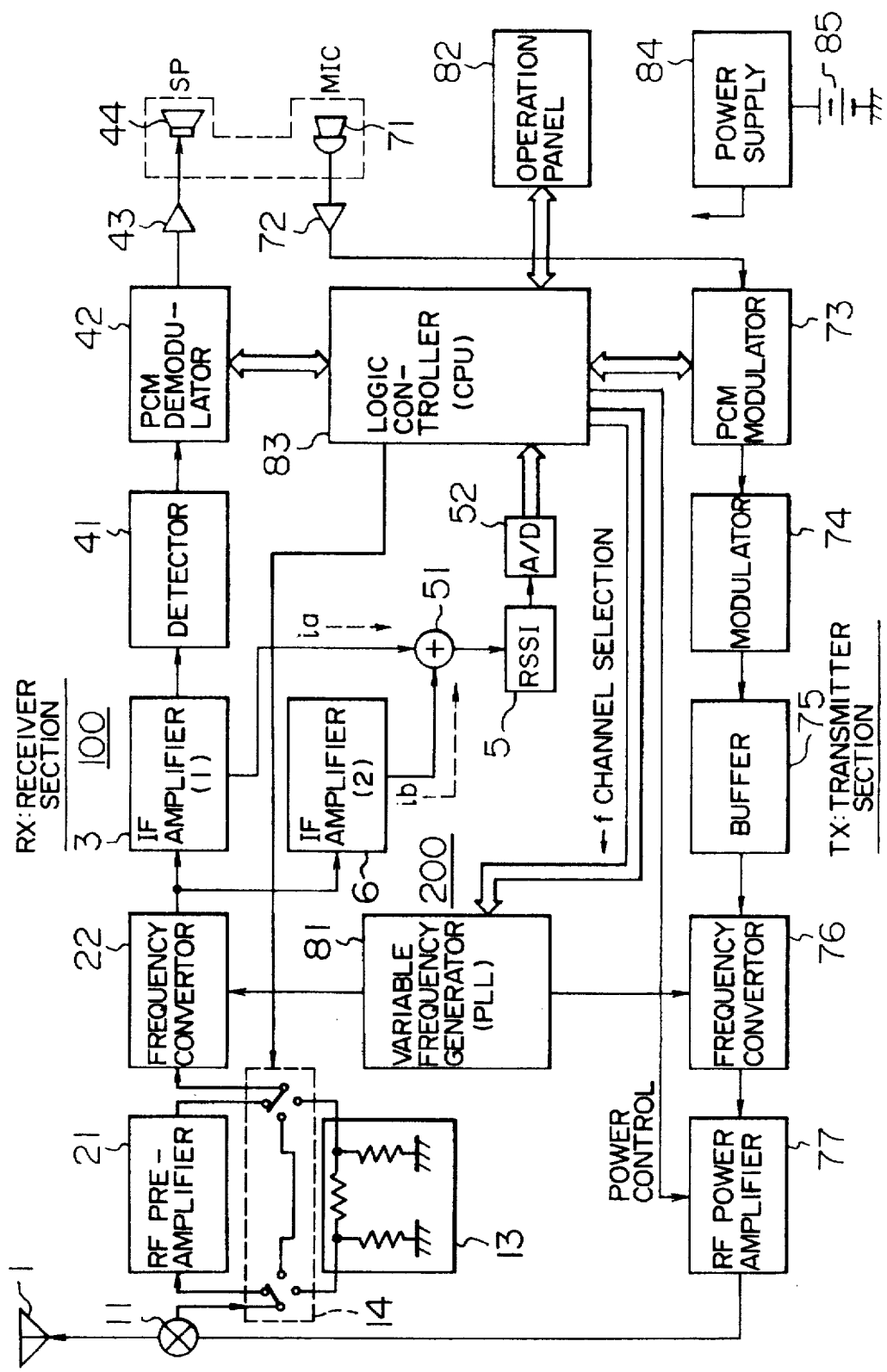
FIG. 10 is a block circuit diagram showing a second embodiment of a cellular telephone to which the radio communication apparatus of the present invention is applied.

FIG. 10 shows another embodiment of a portable cordless telephone of zone selection type or a so-called cellular telephone to which the radio communication apparatus of the present invention is applied.

Explaining particularly differences between this embodiment and the embodiment shown in FIG. 7, the radio communication apparatus shown in FIG. 10 includes a signal switching circuit 14 controlled by a controller 83 based on an output of a signal strength detector circuit 5 and an attenuator 13 coupled to a high frequency signal amplifier 21 in a receiver section RX through the signal switching circuit 14, such that the gain for the received signal from an antenna 1 is switched in accordance with the field strength thereof, to one of three paths: a path to the high frequency amplifier 21 for amplifying the received signal; a path bypassing the high frequency amplifier 21 without amplification; and a path to the attenuator 13. The attenuator 13 is formed of a non-inductive type resistive attenuator in consideration of impedance matching.

With this configuration, even in a strong electric field region in which an excessively large input signal may cause a suppression phenomenon to occur in the high frequency amplifier 21, a proper transmitted output can be variably set precisely in accordance with a detected field strength of the excessively large input signal. The controller 83 in this case is configured to perform control operations in consideration of changes in the level of a field strength detection output caused by the switching of the high frequency gain.

Figure 11:
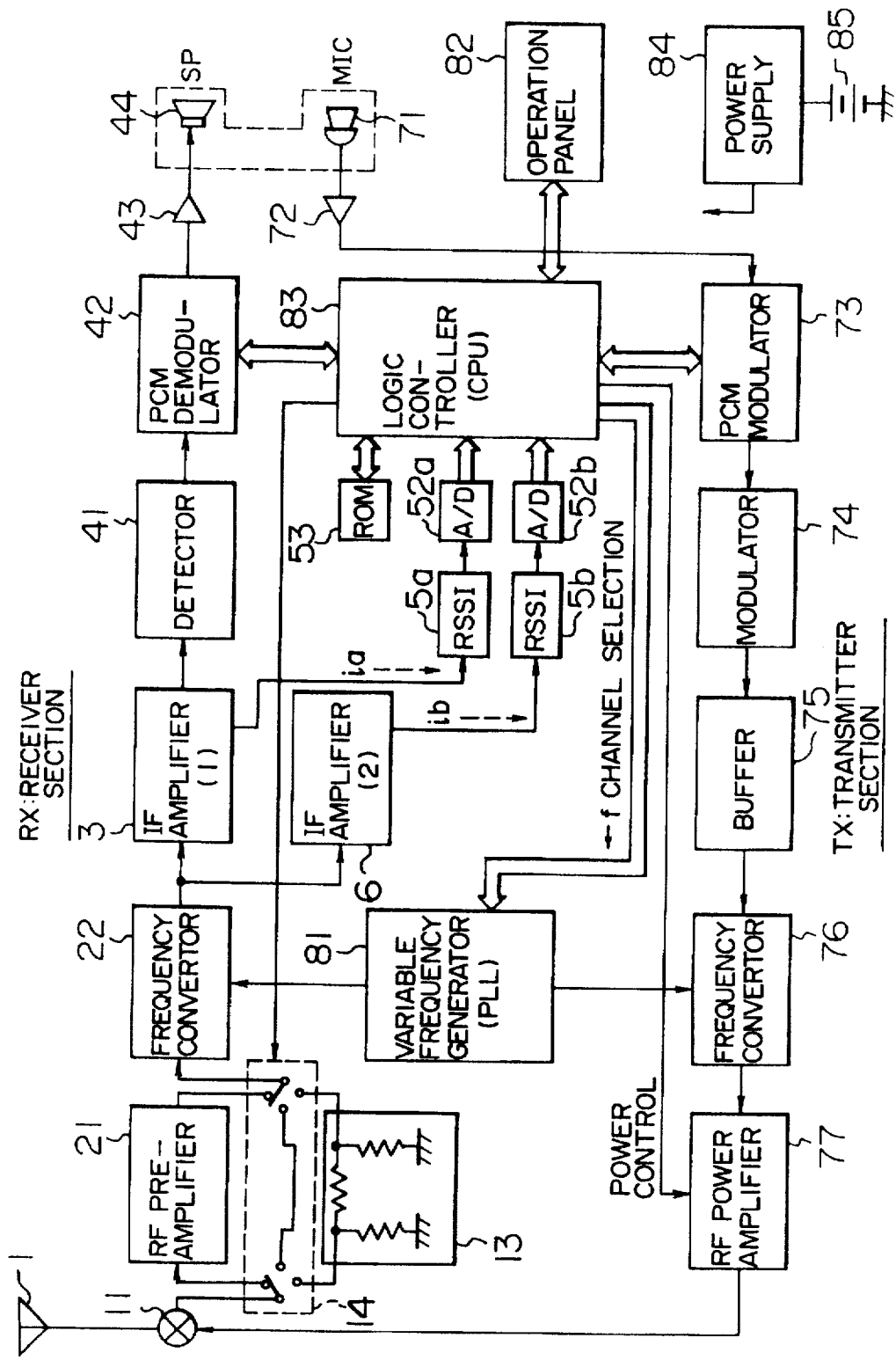
FIG. 11 is a block circuit diagram showing a third embodiment of a cellular telephone to which the radio communication apparatus of the present invention is applied.

FIG. 11 shows a further embodiment of a portable cordless telephone of zone selection type, i.e., the so-called cellular telephone to which the radio communication apparatus of the present invention is applied.

In this embodiment, separate signal strength detector circuits 5a, 5b are provided in first and second signal paths 100, 200, respectively. Field strength detection outputs are digitized by A/D converters 52a, 52b and delivered to a controller 83 separately through both the first and second signal paths 100, 200. The controller 83 combines the two digitized signal strength detection outputs by digital processing and performs controls on transmitted output and so on based on the resultant combined signal strength detection output. A ROM 53 is shown connected to the controller 83.

Figure 12:
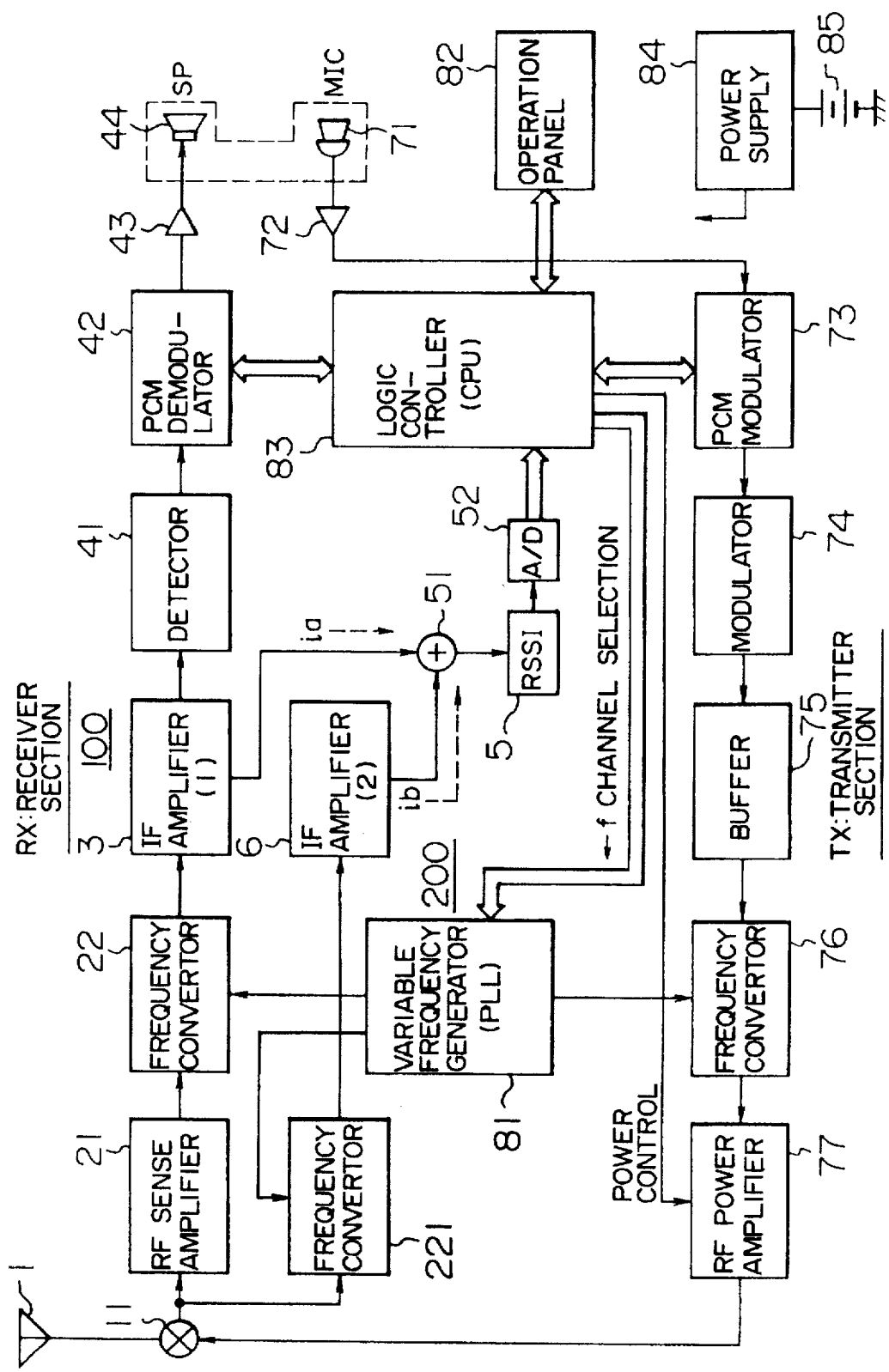
FIG. 12 is a block circuit diagram showing a fourth embodiment of a cellular telephone to which the radio communication apparatus of the present invention is applied.

FIG. 12 shows a further embodiment of a portable cordless telephone of zone selection type, i.e., the so-called cellular telephone to which the radio communication apparatus of the present invention is applied.

In this embodiment, a first signal path 100 and a second signal path 200 have frequency convertors 22, 221, respectively, such that a received signal from an antenna 1 is separated prior to frequency conversion, and the two signals are transferred separately through the respective signal paths. The first signal path 100 is composed of circuits which give priority to the performance of the receiver, while the second signal path 200 is composed of circuits which give priority to the accuracy of the field strength of received signals in a high field strength region. Detection signals ia, ib respectively extracted from the two signal paths 100, 200 are combined such that the field strength of a received signal can be highly accurately detected over a wide dynamic range from a weak electric field to a strong electric field.

While the invention created by the present inventors has been specifically described in connection with several embodiments thereof, it goes without saying that the present invention is not limited to the foregoing embodiments, and may be modified in various ways without departing from the gist thereof. For example, although the receiver section RX has been configured as a single super-heterodyne form in the illustrated embodiments, a double super-heterodyne or triple super-heterodyne form may also be employed. Also, the modulating method used by the transmitter section TX may be a single side band (SSB) or spread spectrum modulation method.

While in the foregoing description, the invention created by the present inventors has been described for the case where it is applied to a portable telephone (cellular telephone), i.e., one of industrial fields of utilization which has required it, the present invention is not limited thereto, but may also be applied, for example, to radio communication apparatuses or systems for use in fixed telephone applications.

We claim:

1. A radio communication apparatus comprising:
    a first signal path including at least one first amplifier for amplifying a signal, at least one second amplifier for amplifying an output of said at least one first amplifier, and at least one first detector for detecting said amplified signal;
    a second signal path connected to an input portion of said first signal path including at least one third amplifier for amplifying said signal, and at least one second detector for detecting said amplified signal output from said at least one third amplifier;
    a signal strength detector circuit connected to said first and second signal paths for adding said detected signal of said first detector and said detected signal of said second detector;
    wherein said at least one first amplifier includes a pair of transistors having emitters and collectors, respectively; collector resistors connected to the collectors of said respective transistors; and a current source directly connected to said emitters, said at least one first amplifier performing differential operation;
    said at least one second amplifier includes a pair of transistors having collectors and emitters, respectively; collector resistors connected to the collectors of said respective transistors; emitter resistors connected to the emitters of said respective transistors; and a current source connected to said emitter resistors, said at least one second amplifier performing differential operation; and
    said at least one third amplifier includes a pair of transistors having collectors and emitters, respectively; collector resistors connected to the collectors of said respective transistors; emitter resistors connected to the emitters of said respective transistors; and a current source connected to the emitter resistors, said at least one third amplifier performing differential operation.

2. A radio communication apparatus according to claim 1, wherein said first signal path has a function of expanding a dynamic range in a smaller signal region as compared with said second signal path, and said second signal path has a function of expanding the dynamic range in a larger signal region as compared with said first signal path.

3. A radio communication apparatus according to claim 2, wherein:
    amplified outputs of said at least one second amplifier in said first signal path is connected through resistors to the input of said at least one first amplifier in said first signal path to form a negative feedback circuit.

4. A radio communication apparatus according to claim 2, further comprising:
    a transmission control circuit connected to receive an output of said signal strength detector circuit for providing a signal for adjusting a signal transmission output; and
    a transmitter connected to said transmission control circuit for adjusting the signal transmission output in response to said adjusting signal.

5. A radio communication apparatus according to claim 2, further comprising:
    a front-end tuner circuit connected to the input portion of said first signal path for frequency converting said signal; and
    a demodulator circuit connected to an output portion of said first signal path for demodulating a detected signal.

6. A radio communication apparatus according to claim 1, further comprising an attenuator connected to an input portion of said second signal path for attenuating said signal.

7. An apparatus according to claim 1, further comprising a connection portion for wired-connecting outputs from said first and second detectors with each other.

8. An apparatus according to claim 1, further comprising:
    a front-end tuner circuit connected to the input portion of said first signal path for frequency converting said signal; and
    a demodulator circuit connected to an output portion of said first signal path for demodulating a detected signal.

9. An apparatus according to claim 8, wherein:
    said at least one second amplifier is a plurality of second amplifiers, each including a pair of transistors; collector resistors connected to the collectors of said respective transistors in the pair; emitter resistors connected to the emitters of said respective transistors in the pair; and a current source connected to said emitter resistors, each second amplifier being connected to perform differential operation; and
    said at least one third amplifier is a plurality of third amplifiers, each including a pair of transistors; collector resistors connected to the collectors of said respective transistors in the pair; emitter resistors connected to the emitters of said respective transistors in the pair; and a current source connected to said emitter resistors, each third amplifier being connected to perform differential operation.

10. An apparatus according to claim 9, further comprising an attenuator connected to an input portion of said second signal path for attenuating said signal.

11. A radio communication apparatus comprising:
    a first signal path for amplifying and detecting a received signal and transferring said received signal to a demodulator;
    a second signal path for amplifying and detecting said received signal separately from said first signal path; and
    a signal strength detector circuit for detecting the field strength of said received signal from a detection signal extracted from said first signal path and a detection signal extracted from said second signal path,
    wherein said first signal path includes a first differential pair of transistors having emitters and collectors, respectively; collector resistors connected to the collectors of said first differential pair of transistors; and a current source directly connected to said emitters; and a second differential pair of transistors having collectors and emitters, respectively; collector resistors connected to the collectors of said second differential pair of transistors; emitter resistors connected to the emitters of said second differential pair of transistors; and a current source connected to said emitter resistors; and wherein said second signal path includes a third differential pair of transistors having collectors and emitters, respectively; collector resistors connected to the collectors of said third differential pair of transistors; emitter resistors connected to the emitters of said respective transistors; and a current source connected to the emitter resistors.

12. A radio communication apparatus according to claim 11, wherein said second signal path includes an attenuator arranged at an input portion thereof.

13. A radio communication apparatus comprising:

a radio receiver section;

a radio transmitter section;

a signal strength detector circuit for determining the field strength of a received signal;

control means for variably controlling a radio transmitted output in said radio transmitter section based on an output of said signal strength detector circuit;

a first signal path included in said radio receiver section and having a plurality of amplifiers for amplifying, detecting, and transferring a radio received signal from an antenna, said first signal path including a first differential pair of transistors having respective emitters and collectors, and a current source directly connected to said emitters; and a second differential pair of transistors having respective collectors and emitters, emitter resistors connected to the emitters of said second differential pair of transistors, and a current source connected to said emitter resistors;

a demodulator connected to said first signal path for demodulating the signal transferred from said first signal path; and a second signal path included in said radio receiver section and having at least one amplifier for amplifying, detecting, and transferring said radio received signal separately from said first signal path, said second signal path including a third differential pair of transistors having respective collectors and emitters, emitter resistors connected to the emitters of said third differential pair of transistors, and a current source connected to said emitter resistors;

wherein said signal strength detector circuit outputs a signal indicative of the field strength of said radio received signal from a detection signal extracted from said first signal path and a detection output extracted from said second signal path; and wherein said control means variably controls said radio transmitted output based on the output of said signal strength detector circuit.

14. A radio communication apparatus according to claim 13, wherein said first signal path is composed of circuits which give priority to lower noise figure, and said second signal path is composed of circuits which give priority to wider dynamic range.

15. A radio communication apparatus according to claim 13, further comprising:

A/D convertor means for separately converting a first detection signal extracted from said first signal path and a second detection signal extracted from said second signal path to digital signals, an output of said A/D convertor means being provided to said signal strength detector circuit;

wherein said control means performs digital processing on the output of said signal strength detector circuit, and performs an optimal control for the radio transmitted output based on the received signal strength produced by said digital processing.

16. A radio communication apparatus according to claim 13, further comprising:

an attenuator for attenuating an input level of a radio received signal from said antenna;

switching means for removably inserting said attenuator between said antenna and said first and second signal paths; and control means for controlling switching operations of said switching means based on the output of said signal strength detector circuit.

17. A radio communication apparatus according to claim 13, further comprising control means for controlling selection of a radio zone based on the field strength of the received signal detected by said signal strength detector circuit.

* * * * *